Dec. 9, 1969    M. G. CURRAN    3,482,288
SAFETY HARNESS BUCKLE
Filed Feb. 28, 1968

INVENTOR.
MICHAEL G. CURRAN
BY
ATTORNEYS

United States Patent Office 3,482,288
Patented Dec. 9, 1969

3,482,288
SAFETY HARNESS BUCKLE
Michael G. Curran, 11608 Detroit Ave.,
Cleveland, Ohio 44102
Filed Feb. 28, 1968, Ser. No. 708,918
Int. Cl. A44b *11/25, 11/10*
U.S. Cl. 24—75
1 Claim

ABSTRACT OF THE DISCLOSURE

The invention has to do with a safety harness buckle for vehicular use adapted to connect the opposite ends of a safety belt that is anchored rearwardly of the vehicle seat. Preferably the buckle comprises a rectangular retaining member provided with a transversely extending slot and a rectangular retaining member provided with a reversely bent portion capable of entering into said transversely extending slot. Each of the two retaining members takes the form of an open rectangular frame that is bridged by one or more laterally movable captive links of the nature of fabric spreaders.

RELATED CASES

A safety harness making use of a plurality of laterally spaced rectangular retaining members bridged by captive links is shown, described and claimed in prior application Ser. No. 683,669 (now Patent No. 3,463,545) for "Multiple Belt Seat Harness." Among other things, the invention differs from that of said prior application in that the retaining members are not spaced but coupled to each other when the safety harness is in use. Two of the retaining members of the present application constitute a buckle, the two halves of which can readily be coupled and uncoupled.

OBJECT OF THE INVENTION

The invention of the present application has as its principal object the provision of a safety harness consisting of a belt or plurality of belts equipped with simple, sturdy buckle means the coupling elements or halves of which can rapidly and easily be connected to and disconnected from each other.

DRAWINGS

Figure 1:
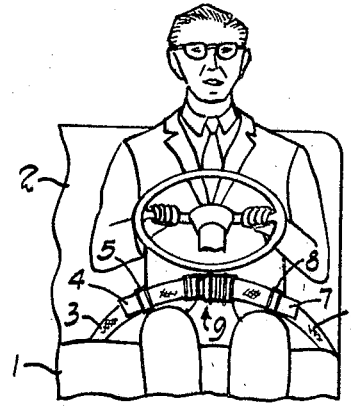
Figure 2:
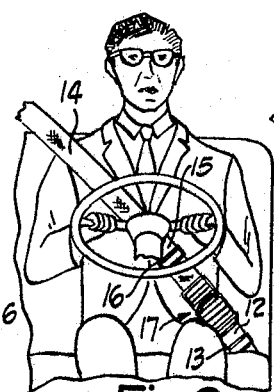
Figure 3:
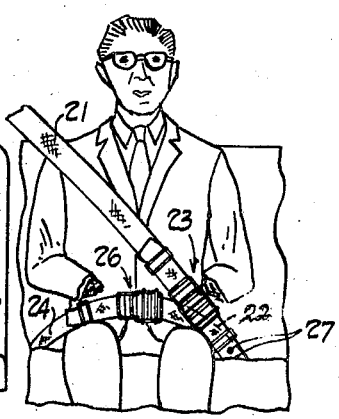
Figure 4:
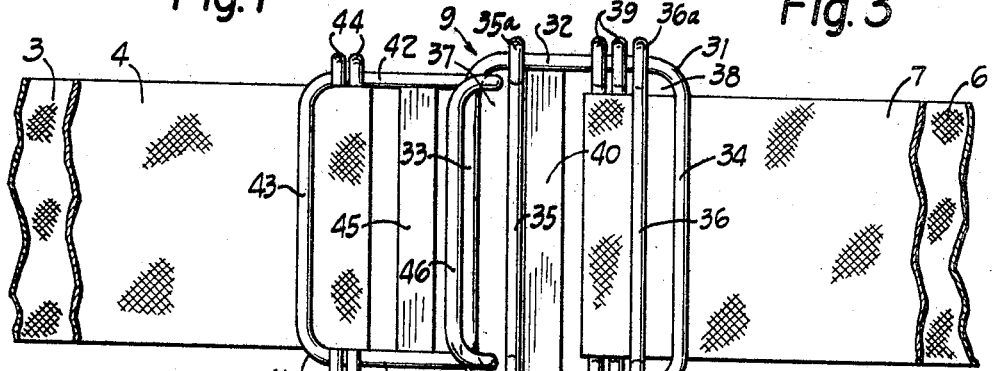
Figure 5:
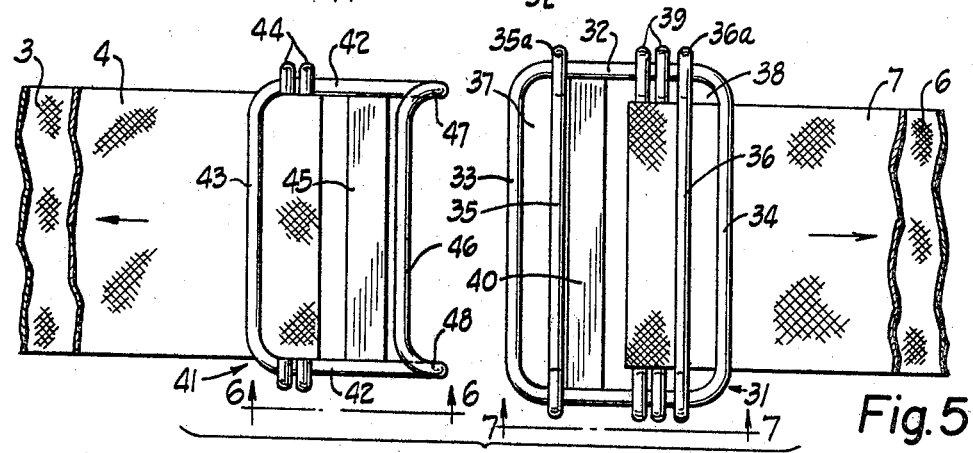
Figures 6, 7:
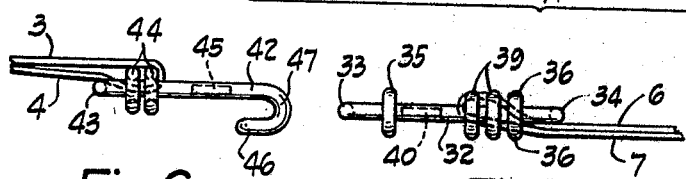

In the accompanying drawings,
FIGURES 1, 2 and 3 show, respectively, the buckle of the present invention as used with a lap belt, a shoulder belt, and a combined lap and shoulder belt;
FIGURE 4 is a front elevation of the buckle as it appears when the two buckle halves are coupled or connected together;
FIGURE 5 is a like view showing the buckle as it appears when the two buckle halves are uncoupled or disconnected;
FIGURES 6 and 7 show the two buckle halves as seen from below; e.g., seen as if from line 6—6 of FIGURE 5.

DESCRIPTION OF THE INVENTION

In FIGURE 1, the seat and back of an automobile are indicated at 1 and 2, respectively. The lap belt appearing therein is of a type wherein, at or near its middle portion, the belt is anchored to the floor of the automobile behind seat 1. Belt half 3, seen at the left, emerges as shown from the space between the seat and the back. It is of an overall length such that it can be doubled back onto itself far enough to facilitate holding leading end 4 in place by means of an adjustable retaining member 5 of the kind illustrated in application Ser. No. 683,669. Belt half 6, seen at the right, is doubled back in similar fashion to an extent such as to permit leading end 7 to be held in place by a similar retaining member 8.

Buckle 9, which will be described below, is centered between belt halves 3 and 6.

FIGURE 2 illustrates the use of a like belt as a shoulder belt. Belt half 12, the leading end of which is doubled back and held in position by adjustable retaining member 13, has its origin in a suitable anchor on the floor of the vehicle. Belt half 14, on the other hand, has its origin in an anchor (not shown) on the automobile roof. Leading end 15 thereof is doubled back as described above and provided with an adjustable retaining member 16. Buckle 17 is of the same construction as buckle 9 in FIGURE 1.

In FIGURE 3 is illustrated a combination belt which has virtually all of the features of the lap and shoulder belts of FIGURES 1 and 2. The shoulder belt portion consists of two belt halves 21 and 22 that are held together by a buckle 23. In lap belt 24, the belt halves are coupled together by a buckle 26. Buckles 23 and 26 are identical and of the same construction as buckle 9. In the lower right-hand corner of FIGURE 3, rivets are shown at 27 as used to fasten belt half 22 of the shoulder belt to the underlying portion of the lap belt. Stitching may be used instead and may be preferred in some cases.

Referring now to FIGURES 4 and 5, which show the details of buckle 9, belt half 6 and double-back portion 7 appear as in FIGURE 1 at the right. The half-buckle on belt half 6 consists in part of a sturdy frame 31 made of heavy duty steel wire. Frame 31 is characterized by short upper and lower end portions 32 paralleling the belt as a whole and by relatively long side portions 33, 34 that extend transversely to them. Of generally rectangular shape, frame 31 is formed by bending the wire on a template and welding its opposite ends together. Except in cases in which stainless steel is utilized, the parts of the half buckle will normally be plated with chromium, nickel, cadmium or some other suitable corrosion-resistant substance.

Spaced a short distance inward of side portion 33 of frame 31 is a link 35, one of four employed in the half buckle, constructed after the fashion of the captive links shown and described in prior application 683,669. Link 35 is not free to move on frame 31; instead, its upper and lower end loops 35a are welded to upper and lower end portions 32. This gives rise to an elongated opening or slot 37, best seen in FIGURE 5, that extends transversely to the belt as a whole. A similar link 36 is welded to frame 31 a short distance inward of side portion 34, thus producing a second elongated opening or slot 38 on the opposite side of frame 31.

In the same half buckle, between stationary links 35 and 36, there are two self-adjusting links 39 constructed after the fashion of the captive links disclosed in prior application 683,669. As indicated in FIGURE 7, the leading end 7 of the belt half with which such half buckle is used is threaded into frame 31 from the right, passing to the rear of stationary link 36, around moveable links 39, where its direction is reversed, and out behind stationary link 36 and slot 38. In addition to preventing slippage of the belt half and the half buckle, link 36 and links 39 serve as fabric stretchers.

A rigid spacer 40 may be used as shown in FIGURE 4 to limit the distance through which links 39 may move.

At the opposite end of the lap belt appearing in FIGURE 1 is the half buckle shown at the left in FIGURES 4 and 5. It consists of a similar generally rectangular wire frame 41 characterized by relatively short upper and lower end portions 42 and an intervening left side portion 43. Two self-adjusting links 44 are disposed between left side portion 43 and a rigid spacer 45 similar to spacer 40. On the opposite side of the left-hand half buckle; i.e., the side opposite side portion 43, end portion 46 is offset from the general plane of the half buckle. To bring about this result, the half buckle is reversely bent at 47 and 48 (FIGURE 5), thus producing a broad hook-shaped member that in a sense extends transversely to end portions 42.

The offset, best seen in FIGURE 6, is such as to allow 90 degree angling of the two half buckles in relation to each other. This amount of angling is sufficient to permit the hook-shaped member formed as just described to enter freely into slot 37 of the right-hand half buckle. After entry has been accomplished, the buckle halves return or are returned to their normal positions, which is one wherein frames 31 and 41 lie in a common plane.

By so constructing and manipulating the half buckles, a sturdy union can be achieved with a minimum of time and effort. The two inter-engage simply and readily, giving rise to condition in which side portion 46 of frame 41 overlies side portion 33 of frame 31. Mechanical engagement and friction between the contacting surfaces are enough, in normal circumstances, to maintain the union intact until it is desired to separate the half buckles. At that stage, the reverse sequence is followed as explained below. Release elements are not required. They are not employed on either half buckle.

If desired, in the interests of retention in place, spacer 45 may to advantage take the form of a permanent bar magnet, in which case spacer 40 should be of a ferrous material susceptible of being attracted to it.

To disengage the two halves; i.e., to uncouple the buckle, the two half buckles are again angled in relation to each other. By the time the angle is increased to 90 degrees, side portion 46 on frame 41 can readily be urged out of slot 37 in frame 31 by pushing outwardly on frame 31. A relatively small movement is sufficient to disengage the two buckle halves, after which they will present the separated appearance that is exemplified by FIGURE 5.

In FIGURE 6, the preferred manner of threading belt end 3 into the left-hand buckle half is illustrated. Leading end 4 is passed from left to right behind links 44, into the space between links 44 and spacer 45, around the two links, and thence from right to left through the space between the links and side portion 43. By moving retaining member 5 (FIGURE 1) in the desired appropriate direction, meanwhile loosening the belt portion in contact with the buckle half, adjustment for belt size can be achieved without difficulty. After leading end 4 is drawn up, there is no or virtually no likelihood of slippage, either in retaining member 5 or in the buckle half.

In like manner (illustrated in FIGURE 7) belt end 6 may be threaded into the right-hand buckle half.

The open construction, sturdiness, simplicity and low cost of the buckle halves and therefore of the buckle as a whole are important features of the invention. Equally important is the fact that no separate release elements are needed to effect coupling or uncoupling of the buckle halves. Other advantages of the invention, as well as the possibility of departing from what has been shown and described without departing from the spirit of the invention, will be apparent to those skilled in the art.

What is claimed is:

1. A double-ended vehicular safety belt provided between its two ends with a two-part buckle comprising
    a first rigid, rectangular frame member formed of heavy duty wire,
    a plurality of transversely extending links, likewise of heavy duty wire, spanning the frame member from top to bottom between the end portions thereof, at least one of said plurality of links being movable toward and from said end portions and another of them defining one side of an elongated slot within the confines of the frame member at the forward end thereof,
    a second rigid, rectangular frame member formed of heavy duty wire, and
    a plurality of transversely extending links, likewise of heavy duty wire, spanning the second frame member from top to bottom between the end portions thereof, at least one of said plurality of links being movable toward and from said end portions,
wherein the forward end of said second frame member is bent to form an integral, reversely directed coupling portion, said coupling portion being somewhat narrower than said first frame member so as to enable it to lodge securely in the elongated slot in said first frame member.

References Cited
UNITED STATES PATENTS

| | | | |
|---|---|---|---|
| 390,432 | 8/1888 | Arndt | 24—171 X |
| 469,965 | 1/1892 | Covert | 24—196 X |
| 506,494 | 10/1893 | Harrison | 24—75 |
| 629,906 | 8/1899 | Kerngood | 24—171 X |
| 719,152 | 1/1903 | Sleeth | 24—75 X |
| 1,487,395 | 3/1924 | Maltby | 24—194 |
| 1,520,114 | 12/1924 | Brown | 24—195 |

FOREIGN PATENTS

| | | |
|---|---|---|
| 17,188 | 8/1898 | Great Britain. |
| 758,220 | 10/1956 | Great Britain. |

BERNARD A. GELAK, Primary Examiner

U.S. Cl. X.R.

24—196, 2.01